United States Patent
Gekinozu

(10) Patent No.: US 9,350,255 B2
(45) Date of Patent: May 24, 2016

(54) DC-DC CONVERSION DEVICE INCLUDING PULSE WIDTH MODULATION CONTROL

(71) Applicant: FUJI ELECTRIC CO., LTD., Kawasaki-shi (JP)

(72) Inventor: Masakazu Gekinozu, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 151 days.

(21) Appl. No.: 14/330,854

(22) Filed: Jul. 14, 2014

(65) Prior Publication Data
US 2014/0334191 A1 Nov. 13, 2014

Related U.S. Application Data

(63) Continuation of application No. PCT/JP2012/083406, filed on Dec. 25, 2012.

(30) Foreign Application Priority Data

Mar. 5, 2012 (JP) .................................. 2012-047861

(51) Int. Cl.
*H02M 3/337* (2006.01)
*H02M 3/335* (2006.01)
*H02M 1/00* (2006.01)

(52) U.S. Cl.
CPC .......... *H02M 3/33546* (2013.01); *H02M 3/337* (2013.01); *H02M 2001/0058* (2013.01); *Y02B 70/1491* (2013.01)

(58) Field of Classification Search
CPC .......... H02M 3/24; H02M 2001/0032; H02M 2001/0058
See application file for complete search history.

(56) References Cited

U.S. PATENT DOCUMENTS

| | | | | | |
|---|---|---|---|---|---|
| 3,485,987 | A | * | 12/1969 | Porterfield | B23H 1/022 219/113 |
| 4,794,506 | A | * | 12/1988 | Hino | H02M 3/3376 363/132 |
| 5,898,581 | A | * | 4/1999 | Liu | H02M 1/34 363/132 |
| 5,963,436 | A | * | 10/1999 | Yoshida | H02M 3/3376 363/132 |

(Continued)

FOREIGN PATENT DOCUMENTS

| | | |
|---|---|---|
| JP | 08-266045 A | 10/1996 |
| JP | 2002-171755 A | 6/2002 |

(Continued)

OTHER PUBLICATIONS

International Search Report issued in PCT/JP/2012/083406 dated Feb. 5, 2013.

(Continued)

*Primary Examiner* — Timothy J Dole
*Assistant Examiner* — Yusef Ahmed
(74) *Attorney, Agent, or Firm* — Rossi, Kimms & McDowell LLP

(57) ABSTRACT

A circuit of a full-bridge configuration using four semiconductor switch elements is used as a circuit on the primary side of a transformer in a DC-DC conversion device. With this configuration, it is possible to increase the turn ratio of a primary winding and a secondary winding of the transformer and thus increase a voltage generated in the primary winding, and to decrease a current flowing through the primary winding of the transformer and thus decrease breaking currents of the semiconductor switch elements.

10 Claims, 2 Drawing Sheets

(56) References Cited

U.S. PATENT DOCUMENTS

| | | | | |
|---|---|---|---|---|
| 7,859,870 B1* | 12/2010 | Schutten | ............... | H02M 3/337 363/132 |
| 2001/0009516 A1* | 7/2001 | Kato | ....................... | H02M 1/34 363/17 |
| 2002/0001210 A1* | 1/2002 | Kuranuki | ............ | H02M 3/3376 363/98 |
| 2002/0054498 A1* | 5/2002 | Cho | .................... | H02M 3/3376 363/132 |
| 2005/0173615 A1* | 8/2005 | Hontele | ............ | H02M 3/33569 250/203.1 |
| 2007/0008744 A1* | 1/2007 | Heo | .................... | H02M 3/3376 363/17 |
| 2008/0219030 A1* | 9/2008 | Chang | ............... | H02M 3/33569 363/17 |
| 2008/0247194 A1* | 10/2008 | Ying | .................... | H02M 3/3376 363/17 |
| 2009/0129123 A1* | 5/2009 | Taurand | ............ | H02M 3/33576 363/17 |
| 2011/0019454 A1* | 1/2011 | Fotherby | ................. | H02M 1/08 363/132 |
| 2012/0249059 A1* | 10/2012 | Matsumae | ............ | H02M 3/337 320/107 |
| 2012/0293072 A1* | 11/2012 | Chang | ................ | H05B 33/0809 315/121 |
| 2013/0100707 A1* | 4/2013 | Hatakeyama | ........ | H02M 3/3376 363/17 |
| 2014/0362606 A1* | 12/2014 | Gekinozu | ........... | H02M 3/3376 363/17 |
| 2015/0098250 A1* | 4/2015 | Wu | .................... | H02M 3/33507 363/17 |
| 2015/0236600 A1* | 8/2015 | Waffler | ............. | H02M 3/33515 378/119 |
| 2015/0357922 A1* | 12/2015 | Lai | .................... | H02M 3/33507 363/21.02 |
| 2015/0381060 A1* | 12/2015 | Eng | .................... | H02M 3/33546 363/21.03 |

FOREIGN PATENT DOCUMENTS

| | | |
|---|---|---|
| JP | 2004040983 A | 2/2004 |
| JP | 2005-318757 A | 11/2005 |
| JP | 2007-221915 A | 8/2007 |
| JP | 2011-130577 A | 6/2011 |
| JP | 2011-205862 A | 10/2011 |
| WO | 2010/107060 A1 | 9/2010 |
| WO | 2011161729 A1 | 12/2011 |

OTHER PUBLICATIONS

Japanese Office Action issued in Japanese counterpart application No. JP2014-503426, dated Apr. 14, 2015. English translation provided.

* cited by examiner

WHEN AT HIGH INPUT VOLTAGE AND
UNDER LIGHT OR MODERATE LOAD

WHEN AT LOW INPUT VOLTAGE
AND UNDER HEAVY LOAD

WHEN AT HIGH INPUT VOLTAGE AND
UNDER LIGHT OR MODERATE LOAD

DC-DC CONVERSION DEVICE INCLUDING PULSE WIDTH MODULATION CONTROL

CROSS-REFERENCE TO RELATED CASES

This application is a continuation of International Application No. PCT/JP2012/83406, filed on Dec. 25, 2012, which is based on and claims priority to Japanese Patent Application No. JP 2012-047861, filed on Mar. 5, 2012. The disclosure of the Japanese priority application and the PCT application in their entirety, including the drawings, claims, and the specification thereof, are incorporated herein by reference.

BACKGROUND

1. Field of the Invention

The present invention relates to a DC-DC conversion device which generates an alternating current voltage in a primary winding of a transformer based on an input direct current voltage from a direct current power source, and generates a direct current voltage by rectifying and smoothing an alternating current voltage generated in a secondary winding of the transformer.

2. Related Art

FIG. 3 is a circuit diagram showing a heretofore known configuration example of this kind of DC-DC conversion device. In the DC-DC conversion device, a series arm wherein semiconductor switch elements 101 and 102 are connected in series is connected in parallel to a direct current power source 1. Herein, a diode 111 and a capacitor 121 are connected in parallel to the semiconductor switch element 101, and a diode 112 and a capacitor 122 are connected in parallel to the semiconductor switch element 102. Further, a resonating reactor 3, a primary winding 21 of a transformer 2, and a resonating capacitor 4 are inserted in series between a common node between the semiconductor switch elements 101 and 102 and the negative electrode of the direct current power source 1.

As means for rectifying an alternating current voltage generated in a secondary winding 22 of the transformer 2, a full-wave rectifier circuit 13 of a full-bridge configuration formed of diodes 131 to 134 is connected on the secondary side of the transformer 2. An output voltage of the full-wave rectifier circuit 13 is smoothed by a smoothing capacitor 5 and output from the DC-DC conversion device.

An output voltage detection circuit 6 and pulse-width modulation control circuit 7 configure control means for controlling so that the voltage value of a direct current voltage output by the DC-DC conversion device maintains a target value.

More particularly, the output voltage detection circuit 6 is a circuit which detects the output voltage of the DC-DC conversion device. The pulse-width modulation control circuit 7 is a circuit which repeats the operation of generating a first pulse which turns on the semiconductor switch element 101, and subsequently, generating a second pulse which turns on the semiconductor switch element 102, in a predetermined cycle. The pulse-width modulation control circuit 7, having a pulse-width modulation function, carries out the control of an ON duty, which is the ratio of the pulse width of the first pulse in the cycles of the first and second pulses, in response to an increase and decrease in the output voltage, detected by the output voltage detection circuit 6, from the target value, and thus maintains the output voltage value of the DC-DC conversion device at the target value.

FIG. 4A is a waveform diagram showing an operation example of the DC-DC conversion device when at a low input voltage and under a heavy load, i.e., when the input direct current voltage given from the direct current power source 1 is low, and a load connected to the smoothing capacitor 5 is heavy, while FIG. 4B is a waveform diagram showing an operation example of the DC-DC conversion device when at a high input voltage and under a light or moderate load, i.e., when the input direct current voltage is high, and a load connected to the smoothing capacitor 5 is light or moderate. Each of FIGS. 4A and 4B shows the respective waveforms of a drain-source voltage V101 of the semiconductor switch element 101, a drain-source voltage V102 of the semiconductor switch element 102, a drain current I101 of the semiconductor switch element 101, a drain current I102 of the semiconductor switch element 102, a voltage V4 of the resonating capacitor 4, a voltage V21 of the primary winding 21 of the transformer 2, and currents I131, I132, I133, and I134 flowing respectively through the diodes 131, 132, 133, and 134. Hereafter, a description will be given, referring to FIGS. 4A and 4B, of an operation of the DC-DC conversion device shown in FIG. 3.

As heretofore described, the pulse-width modulation control circuit 7 alternately generates the first pulse which turns on the semiconductor switch element 101 and the second pulse which turns on the semiconductor switch element 102. When the semiconductor switch element 101 is turned on, a resonant current flows via a path from the direct current power source 1 through the semiconductor switch element 101, the resonating reactor 3, and the primary winding 21 of the transformer 2 to the resonating capacitor 4, and the resonating capacitor 4 is charged by the resonant current. During this time, a differential voltage between the input direct current voltage from the direct current power source 1 and the voltage V4 of the resonating capacitor 4 is applied to the primary winding 21 of the transformer 2 and the resonating reactor 3. Further, a voltage corresponding to the voltage V21 of the primary winding 21 is generated in the secondary winding 22 of the transformer 2, and the smoothing capacitor 5 is charged by the voltage via the diodes 131 and 134. Further, direct current power is supplied to an unshown load from the smoothing capacitor 5.

Next, when the semiconductor switch element 101 is turned off, the resonant current having flowed so far is commutated to the capacitors 121 and 122, and the drain-source voltages V101 and V102 of the semiconductor switch elements 101 and 102 rise or drop gradually.

When the drain-source voltage V101 of the turned-off semiconductor switch element 101 reaches the input direct current voltage from the direct current power source 1, the resonant current is commutated to the diode 112. At this time, by the semiconductor switch element 102 being turned on, a resonant current I102 flows via a path from the resonating capacitor 4 through the primary winding 21 of the transformer 2 and the resonating reactor 3 to the semiconductor switch element 102, and discharging of the resonating capacitor 4 is carried out by the resonant current I102. At this time, the voltage V4 of the resonating capacitor 4 is applied to the primary winding 21 of the transformer 2 and the resonating reactor 3. Further, a voltage corresponding to the voltage V21 of the primary winding 21 is generated in the secondary winding 22 of the transformer 2, and the smoothing capacitor 5 is charged by the voltage via the diodes 133 and 132. Further, direct current power is supplied to an unshown load from the smoothing capacitor 5.

Next, when the semiconductor switch element 102 is turned off, the resonant current having flowed so far is commutated to the capacitors 121 and 122, and the drain-source voltages V101 and V102 of the semiconductor switch elements 101 and 102 rise and drop gradually.

When the drain-source voltage V102 of the turned-off semiconductor switch element 102 reaches the input direct current voltage from the direct current power source 1, the resonant current is commutated to the diode 111. At this time, by the semiconductor switch element 101 being turned on, a resonant current flows via a path from the direct current power source 1 through the semiconductor switch element 101, the resonating reactor 3, and the primary winding 21 of the transformer 2 to the resonating capacitor 4, and the resonating capacitor 4 is charged by the resonant current.

By this kind of operation being repeated, another direct current power isolated from the direct current power source 1 is generated based on the input direct current power from the direct current power source 1, and supplied to an unshown load via the smoothing capacitor 5.

Herein, when at a low input voltage and under a heavy load, the semiconductor switch elements 101 and 102 each operate with an ON duty of on the order of 0.5, as shown in FIG. 4A, and the current I101 flowing through the semiconductor switch element 101 and the current I102 flowing though the semiconductor switch element 102 change into a sine wave shape.

When the load of the DC-DC conversion device changes, and the output voltage value of the DC-DC conversion device is off the target value, the pulse-width modulation control circuit 7 changes the respective pulse widths of the first pulse which turns on the semiconductor switch element 101 and the second pulse which turns on the semiconductor switch element 102, and returns the output voltage value of the DC-DC conversion device to the target value.

Further, when at a high input voltage and under a light or moderate load, the ON duty is small, as shown in FIG. 4B. Herein, when the ON duty is small and the period in which the semiconductor switch element 101 is turned on is short, a charging voltage of the resonating capacitor 4 when the period finishes decreases. Because of this, when the semiconductor switch element 102 is turned on, the voltage V21 applied to the primary winding 21 of the transformer 2 decreases, and it is not possible to generate a voltage enough to turn on the diodes 133 and 132 and cause a charging current to flow to the smoothing capacitor 5. Because of this, the currents I132 and I133 of the diodes 132 and 133 is 0 in the period in which the semiconductor switch element 102 is turned on, as illustrated in FIG. 4B. Consequently, the current I102 flowing through the primary winding 21 of the transformer 2 via the semiconductor switch element 102 is kept low. Further, when the semiconductor switch element 101 is turned on, a differential voltage between the input direct current voltage and the voltage V4 of the resonating capacitor 4 is applied to the primary winding 21 of the transformer 2 and the resonating reactor 3. At this time, as the voltage V21 of the primary winding 21 of the transformer 2 is a sufficient size of voltage, a voltage enough to turn on the diodes 131 and 134 and cause a charging current to flow through the smoothing capacitor 5 is generated in the secondary winding 22 of the transformer 2. Because of this, the large currents I131 and I134 flow via the diodes 131 and 134 in the period in which the semiconductor switch element 101 is turned on, as illustrated FIG. 4B. Consequently, when the semiconductor switch element 101 is turned on, a current flowing through the primary winding 21 of the transformer 2 via the semiconductor switch element 101 increases greatly in a linear fashion. Consequently, a breaking current flowing when the semiconductor switch element 101 is turned off does not decrease so much despite when under a light or moderate load.

A description has heretofore been given with the case of a high input voltage and a light or moderate load as an example, but the same problem also arises in the case of each of a high input voltage and a light or moderate load.

As above, the heretofore known DC-DC conversion device has the problem that the breaking currents of the semiconductor switches of a circuit on the primary side of the transformer increase, and power conversion efficiency decreases.

SUMMARY OF INVENTION

The invention, having been contrived bearing in mind the heretofore described circumstances, has an object of providing technological means whereby it is possible to decrease a breaking current flowing through semiconductor switches of a circuit on the primary side of a transformer, and thus prevent a decrease in the power conversion efficiency of a DC-DC conversion device.

The invention provides a DC-DC conversion device which generates an alternating current voltage in a primary winding of a transformer based on an input direct current voltage given from a direct current power source, rectifies and smooths an alternating current voltage generated in a secondary winding of the transformer, and outputs a direct current voltage, the device being characterized by including a first series arm, formed by connecting first and second semiconductor switch elements in series, wherein the first semiconductor switch element is provided on the positive side of the direct current power source, and the second semiconductor switch element is provided on the negative side of the direct current power source; a second series arm, formed by connecting third and fourth semiconductor switch elements in series, wherein the third semiconductor switch element is provided on the positive side of the direct current power source, and the fourth semiconductor switch element is provided on the negative side of the direct current power source; first to fourth capacitors connected in parallel to the first to fourth semiconductor switch elements; first to fourth diodes connected in parallel to the first to fourth semiconductor switch elements; a resonating reactor and resonating capacitor, as well as the primary winding of the transformer, inserted in series between a common node between the first and second semiconductor switch elements and a common node between the third and fourth semiconductor switch elements; and pulse generating means (or generator) which alternately and cyclically generates a first pulse which turns on the first and fourth semiconductor switch elements and a second pulse which turns on the second and third semiconductor switch elements.

According to the invention, the alternating current voltage is applied to the primary winding of the transformer by the pair of first and fourth semiconductor switch elements and the pair of second and third semiconductor switch elements being alternately turned on. Herein, charging of the resonating capacitor in the period in which the pair of first and fourth semiconductor switch elements is turned on, and charging of the resonating capacitor in the period in which the pair of second and third semiconductor switch elements is turned on, are carried out in a direction opposite to each other. Consequently, with the DC-DC conversion device, it is possible to increase a turn ratio which is the ratio of the number of turns of the primary winding of the transformer to the number of turns of the secondary winding, and thus increase a voltage generated in the primary winding. Herein, a current flowing through the primary winding of the transformer is proportional to the reciprocal of the turn ratio of the transformer. Consequently, according to the invention, it is possible to increase the turn ratio of the transformer, and thus decrease the current flowing through the primary winding of the transformer, and it is thereby possible to decrease breaking currents flowing through the first to fourth semiconductor switch elements.

DETAILED DESCRIPTION

Figure 1:
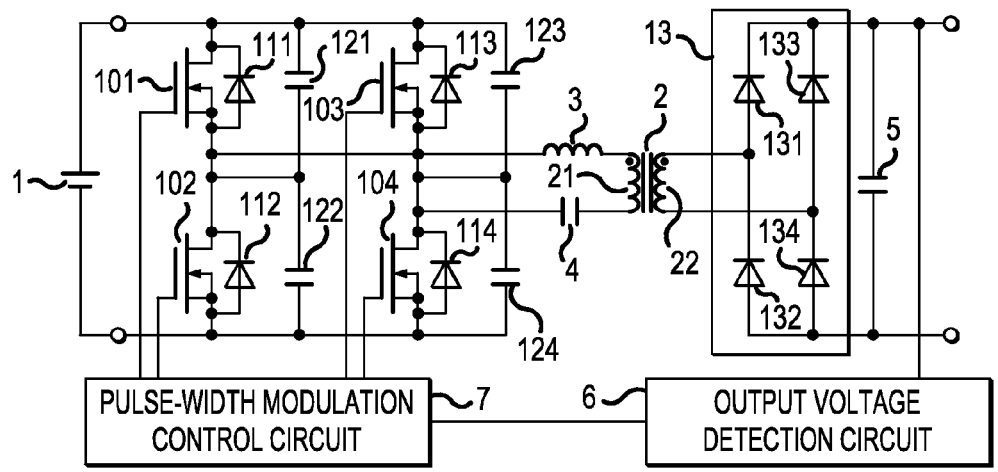
FIG. 1 is a circuit diagram showing a configuration of a DC-DC conversion device which is one embodiment of the invention.

Hereafter, a description will be given, referring to the drawings, of embodiments of the invention.

FIG. 1 is a circuit diagram showing a configuration of a DC-DC conversion device which is one embodiment of the invention. In FIG. 1, the configurations of a full-wave rectifier circuit 13 and a smoothing capacitor 5 provided on the secondary side of a transformer 2, and the configurations of an output voltage detection circuit 6 and a pulse-width modulation control circuit 7, are the same as those previously shown in FIG. 3.

In the DC-DC conversion device according to the embodiment, a first series arm wherein semiconductor switch elements 101 and 102 are connected in series is connected in parallel to, and a second series arm wherein semiconductor switch elements 103 and 104 are connected in series is connected in parallel to a direct current power source 1. Herein, in the first and second series arms, the semiconductor switch elements 101 and 103 are provided on the positive side of the direct current power source 1, while the semiconductor switch elements 102 and 104 are provided on the negative side of the direct current power source 1.

A diode 111 and capacitor 121 are connected in parallel to the semiconductor switch element 101, a diode 112 and a capacitor 122 are connected in parallel to the semiconductor switch element 102, a diode 113 and a capacitor 123 are connected in parallel to the semiconductor switch element 103, and a diode 114 and a capacitor 124 are connected in parallel to the semiconductor switch element 104. Herein, the diodes 111, 112, 113, and 114 are connected in parallel to the respective semiconductor switch elements 101, 102, 103, and 104 so that an input direct current voltage from the direct current power source 1 acts as reverse bias.

Further, a resonating reactor 3, a primary winding 21 of the transformer 2, and a resonating capacitor 4 are inserted in series between a common node between the semiconductor switch elements 101 and 102 and a common node between the semiconductor switch elements 103 and 104. The DC-DC conversion device according to the embodiment switches the input direct current voltage from the direct current power source 1 with a full bridge formed of these kinds of semiconductor switch elements 101, 102, 103, and 104, and gives an alternating current voltage to the primary winding 21 of the transformer 2.

The semiconductor switch elements 101, 102, 103, and 104 are power MOSFETs (Metal Oxide Semiconductor Field Effect Transistors) in the example shown in FIG. 1, but may be other semiconductor switch elements, such as IGBTs (Insulated Gate Bipolar Transistors) or bipolar transistors, which switch between ON and OFF in response to control signals.

The pulse-width modulation control circuit 7 cyclically repeats the action of generating a first pulse which turns on the semiconductor switch elements 101 and 104, and subsequently, generating a second pulse which turns on the semiconductor switch elements 102 and 103. The pulse-width modulation control circuit 7 configures pulse generating means (or generator) which alternately generates the first and second pulses. In the embodiment, main inductance and capacitor value, of inductances and capacitance values interposed in a circuit on the primary side of the transformer 2, specifically, the inductance of the resonating reactor 3 and the capacitance value of the resonating capacitor 4, are determined so that the resonant frequency of the circuit on the primary side of the transformer 2 is in the vicinity of the frequencies of the first and second pulses.

Figure 3:
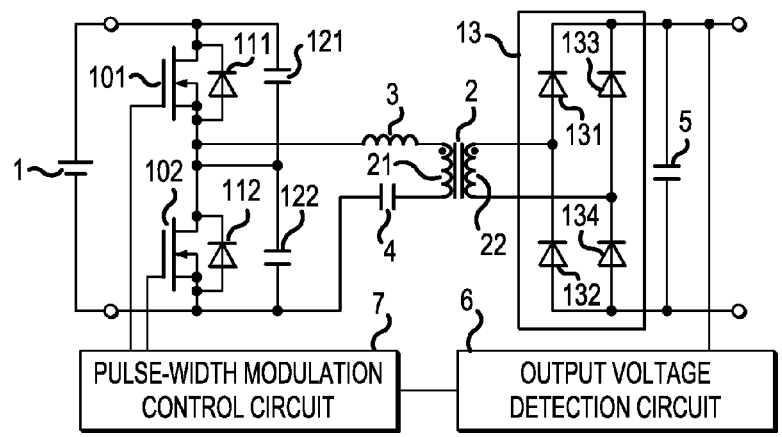
FIG. 3 is a circuit diagram showing a configuration of a heretofore known DC-DC conversion device.

The output voltage detection circuit 6, in the same way as the one previously shown in FIG. 3, is a circuit which detects an output voltage of the DC-DC conversion device. Also, the pulse-width modulation control circuit 7, in accordance with an increase and decrease in the output voltage, detected by the output voltage detection circuit 6, from a target value, carries out the controls of, for example, a first ON duty which is the ratio of the pulse width of the first pulse in the cycles of the first and second pulses, and a second ON duty which is the ratio of the pulse width of the second pulse in the cycles of the first and second pulses, and thus maintains the output voltage value of the DC-DC conversion device at the target value. More particularly, the pulse-width modulation control circuit 7 controls, for example, the first ON duty within a range of 0 to 0.5 and the second ON duty within a range of 0.5 to 1, and carries out the controls of lowering the first ON duty toward 0 and raising the second ON duty toward 1 when the output voltage detected by the output voltage detection circuit 6 is higher than the target value, and raising the first ON duty toward 0.5 and lowering the second ON duty toward 0.5 when the output voltage detected by the output voltage detection circuit 6 is lower than the target value. The pulse-width modulation control circuit 7 may control, for example, the first ON duty within a range of 0.5 to 1 and the second ON duty within a range of 0 to 0.5.

Figure 2:
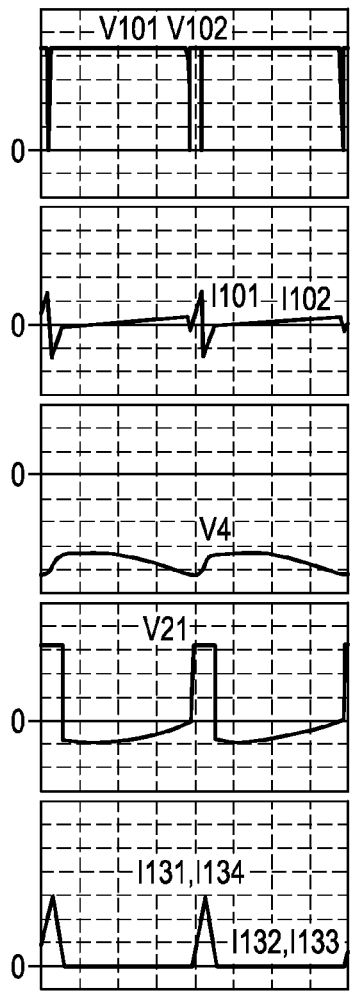
FIG. 2 is a waveform diagram showing waveforms of individual portions of the DC-DC conversion device.

FIG. 2 is a waveform diagram showing an operation example of the DC-DC conversion device when at a high input voltage and under a light or moderate load. FIG. 2 shows the respective waveforms of a drain-source voltage V101 of the semiconductor switch element 101, a drain-source voltage V102 of the semiconductor switch element 102, a drain current I101 of the semiconductor switch element 101, a drain current I102 of the semiconductor switch element 102, a voltage V4 of the resonating capacitor 4, a voltage V21 of the primary winding 21 of the transformer 2, and currents I131, I132, I133, and I134 flowing respectively through the diodes 131, 132, 133, and 134. Hereafter, a description will be given, referring to FIG. 2, of an operation of the embodiment.

When the pulse-width modulation control circuit 7 generates the first pulse, the semiconductor switch element 101 provided on the positive side of the direct current power source 1 in the first series arm, and the semiconductor switch element 104 provided on the negative side of the direct current power source 1 in the second series arm, are turned on. When the semiconductor switch elements 101 and 104 are turned on in this way, a resonant current I101 flows via a path from the direct current power source 1 through the semiconductor switch element 101, the resonating reactor 3, the primary winding 21 of the transformer 2, and the resonating capacitor 4 to the semiconductor switch element 104, and charging of the resonating capacitor 4 is carried out by the resonant current I101. During this time, a differential voltage between the input direct current voltage from the direct current power source 1 and the voltage V4 of the resonating capacitor 4 is applied to the primary winding 21 of the transformer 2 and the resonating reactor 3. Further, a voltage corresponding to the voltage V21 of the primary winding 21 is generated in a secondary winding 22 of the transformer 2, and the smoothing capacitor 5 is charged by the voltage via the diodes 131 and 134. Further, direct current power is supplied to an unshown load from the smoothing capacitor 5.

Next, the pulse-width modulation control circuit 7 causes the first pulse to fall and the second pulse to rise. When the first pulse falls and the semiconductor switch elements 101 and 104 are turned off, the resonant current having flowed so far is commutated to the capacitors 121, 122, 123, and 124, and the drain-source voltages of the semiconductor switch elements 101, 102, 103, and 104 rise or drop gradually.

When the drain-source voltages V101 and V104 of the turned-off semiconductor switch elements 101 and 104 reach the input direct current voltage from the direct current power source 1, the resonant current is commutated to the diodes 112 and 113. At this time, when the second pulse rises, the semiconductor switch element 102 provided on the negative side of the direct current power source 1 in the first series arm, and the semiconductor switch element 103 provided on the positive side of the direct current power source 1 in the second series arm, are turned on. As a result of this, a resonant current I102 flows via a path from the resonating capacitor 4 through the primary winding 21 of the transformer 2, the resonating reactor 3, the semiconductor switch element 102, and the direct current power source 1 to the semiconductor switch element 103, and discharging (or charging in a direction the reverse of that when the first pulse rises) of the resonating capacitor 4 is carried out by the resonant current I102. During this time, a differential voltage between the input direct current voltage from the direct current power source 1 and the voltage V4 of the resonating reactor 4 is applied to the primary winding 21 of the transformer 2 and the resonating reactor 3. Further, a voltage corresponding to the voltage V21 of the primary winding 21 is generated in the secondary winding 22 of the transformer 2, and the smoothing capacitor 5 is charged by the voltage via the diodes 132 and 133. Further, direct current power is supplied to an unshown load from the smoothing capacitor 5.

Next, the pulse-width modulation control circuit 7 causes the second pulse to fall and the first pulse to rise. When the second pulse falls and the semiconductor switch elements 102 and 103 are turned off, the resonant current having flowed so far is commutated to the capacitors 121, 122, 123, and 124, and the drain-source voltages of the semiconductor switch elements 101, 102, 103, and 104 rise or drop gradually.

When the drain-source voltages V102 and V103 of the turned-off semiconductor switch elements 102 and 103 reach the input direct current voltage from the direct current power source 1, the resonant current is commutated to the diodes 111 and 114. At this time, when the first pulse rises, the semiconductor switch element 101 provided on the positive side of the direct current power source 1 in the first series arm, and the semiconductor switch element 104 provided on the negative side of the direct current power source 1 in the second series arm, are turned on. As a result of this, the resonant current I101 flows via a path from the direct current power source 1 through the semiconductor switch element 101, the resonating reactor 3, the primary winding 21 of the transformer 2, and the resonating capacitor 4 to the semiconductor switch element 104, and charging of the resonating capacitor 4 is carried out by the resonant current I101.

By this kind of operation being repeated, another direct current power isolated from the direct current power source 1 is generated based on the direct current power output by the direct current power source 1, and supplied to an unshown load via the smoothing capacitor 5.

Figure 4A:
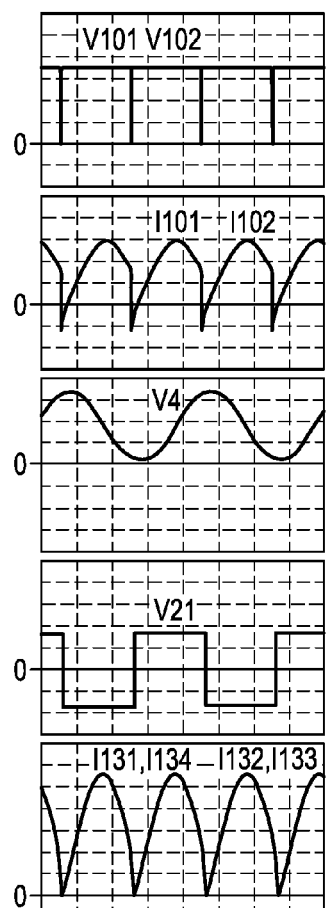
FIGS. 4A and 4B are a waveform diagrams showing waveforms of individual portions of the DC-DC conversion device.
Figure 4B:
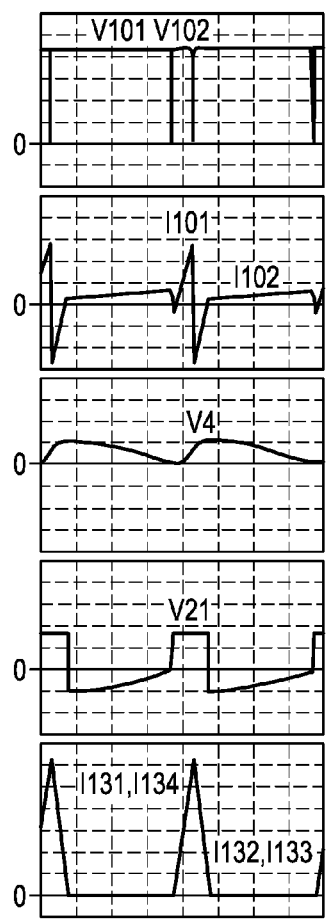

In the DC-DC conversion device according to the embodiment, in the same way as in the DC-DC conversion device previously shown in FIG. 3, the period in which the semiconductor switch element 101 is turned on is short, and the period in which the semiconductor switch element 102 is turned on is long, as shown in (b) of FIG. 4, when at a high input voltage and under a light or moderate load. In the embodiment, however, it is possible to decrease a breaking current flowing through the semiconductor switch elements 101 and 104, and a breaking current flowing through the semiconductor switch elements 102 and 103, compared with breaking currents flowing through the semiconductor switch elements previously shown in FIG. 3. The reason is as follows.

In the DC-DC conversion device previously shown in FIG. 3, one electrode of the resonating capacitor 4 is connected to the negative electrode of the direct current power source 1, and charging of the resonating capacitor 4 is carried out via the semiconductor switch element 101, while discharging of the resonating capacitor 4 is carried out via the semiconductor switch element 102. Because of this, the voltage V4 of the resonating capacitor 4 rises and drops repeatedly in a region of 0V or more, as shown in (a) and (b) of FIG. 4. Consequently, there is less room to widen the amplitude of the voltage V21 generated in the primary winding 21 of the transformer 2.

As opposed to this, in the DC-DC conversion device according to the embodiment, the resonating capacitor 4 is inserted between the common node between the semiconductor switch elements 101 and 102 and the common node between the semiconductor switch elements 103 and 104. Further, the operation of the semiconductor switch elements 101 and 104 being turned on to cause the current to flow through the resonating capacitor 4, and the operation of the semiconductor switch elements 102 and 103 being turned on to cause the current to flow through the resonating capacitor 4, are alternately repeated.

Herein, the current flowing through the resonating capacitor 4 in the period in which the semiconductor switch elements 101 and 104 are turned on, and the current flowing through the resonating capacitor 4 in the period in which the semiconductor switch elements 102 and 103 are turned on, are opposite in polarity. Consequently, the level of a direct current component (or an average voltage) of the voltage V4 of the resonating capacitor 4 depends on the first and second ON duties. More particularly, when the first and second ON duties are 0.5, the level of the direct current component of the voltage V4 is substantially 0V, and when the first ON duty approaches 0, and the second ON duty approaches 1, when at a high input voltage or under a light or moderate load (when the period in which the semiconductor switch elements 101 and 104 are turned on is short, as shown in FIG. 2), the level of the direct current component of the voltage V4 moves in a negative direction. Further, in the embodiment, a differential voltage between the input direct current voltage and the voltage V4 is applied to the primary winding 21 of the transformer 2 and the resonating reactor 3. In this way, the DC-DC conversion device according to the embodiment is such that it is possible in the configuration thereof to make the voltage V21 generated in the primary winding 21 of the transformer 2 higher than in the DC-DC conversion device previously shown in FIG. 3.

Consequently, according to the embodiment, when it is taken that the same direct current voltage as in the DC-DC conversion device previously shown in FIG. 3 is output, it is possible to increase a turn ratio n=n21/n22 of a number of turns n21 of the primary winding 21 of the transformer 2 to a number of turns n22 of the secondary winding 22 and thus increase the voltage V21 generated in the primary winding 21. Herein, the current flowing through the primary winding 21 of the transformer 2 is proportional to the reciprocal of the turn ratio n of the transformer 2. Consequently, in the embodiment, it is possible to increase the turn ratio n of the transformer 2 and thus decrease the current flowing through the primary winding 21 of the transformer 2. Because of this, it is possible to decrease the breaking current flowing through the semiconductor switch elements 101 and 104 when the semiconductor switch elements 101 and 104 are turned off and the breaking current flowing through the semiconductor switch elements 102 and 103 when the semiconductor switch elements 102 and 103 are turned off. Further, according to the embodiment, as it is possible to decrease the breaking currents of the semiconductor switch elements 101, 102, 103, and 104, it is possible to reduce switching losses of the semiconductor switch elements 101, 102, 103, and 104 particularly when at a high input voltage or when under a light or moderate load, and thus prevent a decrease in conversion efficiency. Also, according to the embodiment, as it is possible to decrease the current caused to flow through the primary winding 21 of the transformer 2, it is possible to reduce copper loss of the transformer 2. Also, according to the embodiment, as it is possible to decrease an effective current caused to flow through the resonating capacitor 4, it is possible to configure the DC-DC conversion device using an inexpensive resonating capacitor 4 with a low allowable effective current.

Other Embodiments

A description has heretofore been given of one embodiment of the invention, but apart from this, other embodiments can be considered for the invention. Examples are as follows.

(1) The diodes 111, 112, 113, and 114 may be substituted for parasitic diodes interposed between the drains or sources of the semiconductor switch elements 101, 102, 103, and 104 and a semiconductor substrate forming the background thereof.

(2) The capacitors 121, 122, 123, and 124 may be substituted for parasitic capacitances interposed between the drains and sources of the semiconductor switch elements 101, 102, 103, and 104 and the semiconductor substrate forming the background thereof.

(3) The resonating reactor 3 may be substituted for the leakage inductance of the transformer 2.

(4) In the heretofore described embodiment, the invention is applied to the DC-DC conversion device which causes the ON duties to change greatly in response to a load change, but the invention can also be applied to a DC-DC conversion device, used in an application with a small load change, wherein the ON duties are not very small. In this embodiment too, it is possible to obtain the advantageous effect of reducing the breaking currents of the semiconductor switch elements on the primary side of the transformer 2 and thus preventing a decrease in voltage conversion efficiency.

What is claimed is:

1. A DC-DC conversion device which generates an alternating current voltage in a primary winding of a transformer based on an input direct current voltage given from a direct current power source, rectifies and smooths an alternating current voltage generated in a secondary winding of the transformer, and outputs a direct current voltage, the device comprising:

a first series arm, formed by connecting first and second semiconductor switch elements in series, wherein the first semiconductor switch element is provided on the positive side of the direct current power source, and the second semiconductor switch element is provided on the negative side of the direct current power source;

a second series arm, formed by connecting third and fourth semiconductor switch elements in series, wherein the third semiconductor switch element is provided on the positive side of the direct current power source, and the fourth semiconductor switch element is provided on the negative side of the direct current power source;

first to fourth capacitors connected in parallel to the first to fourth semiconductor switch elements;

first to fourth diodes connected in parallel to the first to fourth semiconductor switch elements;

a resonating reactor and resonating capacitor, as well as the primary winding of the transformer, inserted in series between a common node between the first and second semiconductor switch elements and a common node between the third and fourth semiconductor switch elements;

a pulse generator which alternately and cyclically generates a first pulse which turns on the first and fourth semiconductor switch elements and a second pulse which turns on the second and third semiconductor switch elements; and an output voltage detection circuit which detects a direct current voltage output by the DC-DC conversion device, wherein the pulse generator includes a pulse-width modulation control circuit which controls the respective pulse widths of the first and second pulses based on a result of the direct current voltage detection in the output voltage detection circuit so that the direct current voltage output by the DC-DC conversion device maintains a target value, the pulse-width modulation control circuit controls one of a first ON duty, which is the ratio of the pulse width of the first pulse in the cycles of the first and second pluses, or a second ON duty, which is the ratio of the pulse width of the second pulse in the cycles of the first and second pulses, within a range of 0 to 0.5, and controls the other ON duty within a range of 0.5 to 1.0, and the pulse-width modulation control circuit raises the one ON duty toward 0.5 and lowers the other ON duty toward 0.5 when the direct current voltage detected by the output voltage detection circuit is lower than the target value, and lowers the one ON duty toward 0 and raises the other ON duty toward 1.0 when the direct current voltage detected by the output voltage detection circuit is higher than the target value.

2. The DC-DC conversion device according to claim 1, wherein the first to fourth capacitors are parasitic capacitances interposed in the first to fourth semiconductor switch elements.

3. The DC-DC conversion device according to claim 1, wherein
the first to fourth diodes are parasitic diodes interposed in the first to fourth semiconductor switch elements.

4. The DC-DC conversion device according to claim 1, wherein
the resonating reactor is leakage inductance of the transformer.

5. The DC-DC conversion device according to claim 1, wherein
the first to fourth semiconductor switch elements are power MOSFETs, IGBTs, or bipolar transistors.

6. A DC-DC conversion device which generates an alternating current voltage in a primary winding of a transformer based on an input direct current voltage given from a direct current power source, rectifies and smooths an alternating current voltage generated in a secondary winding of the transformer, and outputs a direct current voltage, the device comprising:
a first series arm, formed by connecting first and second semiconductor switch elements in series, wherein the first semiconductor switch element is provided on the positive side of the direct current power source, and the second semiconductor switch element is provided on the negative side of the direct current power source;
a second series arm, formed by connecting third and fourth semiconductor switch elements in series, wherein the third semiconductor switch element is provided on the positive side of the direct current power source, and the fourth semiconductor switch element is provided on the negative side of the direct current power source;
first to fourth capacitors connected in parallel to the first to fourth semiconductor switch elements;
first to fourth diodes connected in parallel to the first to fourth semiconductor switch elements;
a resonating reactor and resonating capacitor, as well as the primary winding of the transformer, inserted in series between a common node between the first and second semiconductor switch elements and a common node between the third and fourth semiconductor switch elements; and
a pulse generator which alternately and cyclically generates a first pulse which turns on the first and fourth semiconductor switch elements and a second pulse which turns on the second and third semiconductor switch elements,
wherein, in a primary side circuit connected in series to the primary winding of the transformer, a capacitance value of the resonating capacitor, and inductance interposed in the primary side circuit, are determined so that a resonant frequency determined by the capacitance value and inductance interposed in the primary side circuit is in the vicinity of the frequencies of the first and second pulses;
the DC-DC conversion device further comprising:
an output voltage detection circuit which detects a direct current voltage output by the DC-DC conversion device, wherein
the pulse generator includes a pulse-width modulation control circuit which controls the respective pulse widths of the first and second pulses based on a result of the direct current voltage detection in the output voltage detection circuit so that the direct current voltage output by the DC-DC conversion device maintains a target value,
the pulse-width modulation control circuit controls one of a first ON duty, which is the ratio of the pulse width of the first pulse in the cycles of the first and second pluses, or a second ON duty, which is the ratio of the pulse width of the second pulse in the cycles of the first and second pulses, within a range of 0 to 0.5, and controls the other ON duty within a range of 0.5 to 1.0, and
the pulse-width modulation control circuit raises the one ON duty toward 0.5 and lowers the other ON duty toward 0.5 when the direct current voltage detected by the output voltage detection circuit is lower than the target value, and lowers the one ON duty toward 0 and raises the other ON duty toward 1.0 when the direct current voltage detected by the output voltage detection circuit is higher than the target value.

7. The DC-DC conversion device according to claim 6, wherein
the first to fourth capacitors are parasitic capacitances interposed in the first to fourth semiconductor switch elements.

8. The DC-DC conversion device according to claim 6, wherein
the first to fourth diodes are parasitic diodes interposed in the first to fourth semiconductor switch elements.

9. The DC-DC conversion device according to claim 6, wherein
the resonating reactor is leakage inductance of the transformer.

10. The DC-DC conversion device according to claim 6, wherein
the first to fourth semiconductor switch elements are power MOSFETs, IGBTs, or bipolar transistors.

* * * * *